(12) United States Patent
Sutton et al.

(10) Patent No.: US 12,276,231 B2
(45) Date of Patent: Apr. 15, 2025

(54) SYSTEMS AND METHODS FOR DETERMINING REAL TIME FUEL CONSUMPTION INFORMATION OF AN AIRCRAFT

(71) Applicant: THE BOEING COMPANY, Arlington, VA (US)

(72) Inventors: Forest Sutton, Aurora, CO (US); Stephen Solomon Altus, Campbell, CA (US); Samantha Schwartz, Castle Pines, CO (US); Hendrik Schoeniger, Dreieich (DE); Michael Christian Büddefeld, Neu-Isenburg (DE); Maximilian Peter Juengst, Frankfurt am Main (DE); Salin Maharjan, Offenbach (DE); Andrea Sanzone, Hamburg (DE)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/454,839

(22) Filed: Aug. 24, 2023

(65) Prior Publication Data
US 2025/0067224 A1 Feb. 27, 2025

(51) Int. Cl.
*F02C 9/44* (2006.01)
*B64D 45/00* (2006.01)
*G08G 5/00* (2006.01)

(52) U.S. Cl.
CPC .............. *F02C 9/44* (2013.01); *B64D 45/00* (2013.01); *G08G 5/003* (2013.01)

(58) Field of Classification Search
CPC ... F02C 9/44; B64D 45/00; B64D 2045/0085; G08G 5/003
See application file for complete search history.

(56) References Cited

U.S. PATENT DOCUMENTS 6,047,165 A * 4/2000 Wright ................. G08G 5/0021
455/66.1
2015/0316926 A1* 11/2015 Ziarno ................. G05B 23/0213
701/3
(Continued)

FOREIGN PATENT DOCUMENTS

CN 106971234 A * 7/2017 ............ B64D 37/00
CN 111696389 A * 9/2020 ............ G08G 5/003
(Continued)

OTHER PUBLICATIONS

Extended European Search Report mailed Mar. 1, 2025 for corresponding EP Application No. 24191409.2 (11 pages).
(Continued)

*Primary Examiner* — Steven M Sutherland
(74) *Attorney, Agent, or Firm* — Philip S. Hof; The Small Patent Law Group LLC

(57) ABSTRACT

A system includes one or more control units configured to determine one or more fuel consumption models for an aircraft. A method includes determining, by one or more control units, one or more fuel consumption models for an aircraft. A non-transitory computer-readable storage medium comprising executable instructions that, in response to execution, cause one or more control units comprising a processor, to perform operations including determining one or more fuel consumption models for an aircraft.

20 Claims, 4 Drawing Sheets

(56) References Cited

U.S. PATENT DOCUMENTS

| | | | |
|---|---|---|---|
| 2018/0268100 A1 | 9/2018 | Ren | |
| 2018/0362190 A1* | 12/2018 | Chambers | B64F 5/60 |
| 2019/0005826 A1* | 1/2019 | Lax | G08G 5/0091 |
| 2019/0090800 A1* | 3/2019 | Bosworth | A61B 5/0015 |
| 2020/0079532 A1* | 3/2020 | Rix | B64D 45/00 |
| 2020/0130866 A1* | 4/2020 | Srinivasan | G05B 23/0235 |
| 2021/0383706 A1 | 12/2021 | Gibbons | |

FOREIGN PATENT DOCUMENTS

| | | | | |
|---|---|---|---|---|
| EP | 3675007 A1 | | 7/2020 | |
| EP | 3699833 A1 | | 8/2020 | |
| GB | 2514226 A | * | 11/2014 | G05D 1/0005 |

OTHER PUBLICATIONS

Uzun Mevlut et al: "Design of a Hybrid Digital-Twin Flight Performance Madel Through Machine Learning", 2019 IEEE Aerospace Conference, IEEE, Mar. 2, 2019 (Mar. 2, 2019), pp. 1-14, XP033561652, DOI: 10.1109/AERO.2019.8741729 [retrieved on Jun. 6, 2019].

* cited by examiner

SYSTEMS AND METHODS FOR DETERMINING REAL TIME FUEL CONSUMPTION INFORMATION OF AN AIRCRAFT

FIELD OF THE DISCLOSURE

Examples of the present disclosure generally relate to systems and methods for determining real time fuel consumption information of an aircraft, and providing such information to ground-based systems.

BACKGROUND OF THE DISCLOSURE

Aircraft are used to transport passengers and cargo between various locations. Numerous aircraft depart from and arrive at a typical airport every day.

A basic need across any aircraft operation is to communicate timely, accurate views of flight parameters, particularly in relation to shared situational awareness between flight deck crews and the ground-based personnel (for example, dispatchers, flight-followers, etc.) responsible for flight monitoring and in-flight decision support. While a continuous connection to the flight deck potentially synchronizes such views, such connection may not be feasible due to limited bandwidth and the high cost of in-flight communication.

Typically, during aircraft operations, fuel updates are provided to ground-based systems and support personnel on an intermittent, irregular basis. The shorter the update interval, the higher the cost of communication. Conversely, an increased time of update may reduce accuracy, and potentially lead to interpolation errors. In general, system latencies, manual processing, and an increased potential for error can reduce the ability for ground-based systems and personnel to confidently forecast fuel consumption for a diversion from an original flight plan.

SUMMARY OF THE DISCLOSURE

A need exists for a system and a method for efficiently and effectively deriving, providing, and updating fuel consumption information for an aircraft.

With that need in mind, certain examples of the present disclosure provide a system including one or more control units configured to determine one or more fuel consumption models for an aircraft. In at least one example, the one or more control units are configured to determine the one or more fuel consumption models for the aircraft based on a calibrated performance model for the aircraft, initial conditions for the aircraft, and real time data of the aircraft. A tracking sub-system determines the real time data of the aircraft. The calibrated performance model is based on previously recorded aircraft parameters (data commonly referred to as either Quick Access Record (QAR) data or continuous parameter logging (CPL) data). In at least one example, the one or more control units are configured to determine the calibrated performance model based on historical data of the aircraft, and a generic performance model. The initial conditions can include payload of the aircraft, total fuel onboard the aircraft, a center of gravity of the aircraft, and weather conditions for a flight of the aircraft.

In at least one example, the one or more fuel consumption models include a first fuel consumption model and a second fuel consumption model. The one or more control units are configured to output the first fuel consumption model to a ground-based sub-system. The one or more control units are configured to output the second fuel consumption model to the aircraft. As a further example, the one or more control units are configured to compare the second fuel consumption model with actual fuel consumption determined by one or more fuel sensors of the aircraft. The one or more control units are configured to update both of the first fuel consumption model and the second fuel consumption model in response to the second fuel consumption model differing from the actual fuel consumption.

The system can also include one or more user interfaces including a display and an input device. The control unit is configured to show the one or more fuel consumption models on the display.

The control unit(s) can be further configured to automatically operate one or more controls of the aircraft based on the one or more fuel consumption models.

In at least one example, the one or more control units include an artificial intelligence or machine learning system.

Certain examples of the present disclosure provide a method including determining, by one or more control units, one or more fuel consumption models for an aircraft, wherein said determining is based on a calibrated performance model for the aircraft, initial conditions for the aircraft, and real time data of the aircraft.

Certain examples of the present disclosure provide a non-transitory computer-readable storage medium comprising executable instructions that, in response to execution, cause one or more control units comprising a processor, to perform operations comprising determining one or more fuel consumption models for an aircraft, wherein said determining is based on a calibrated performance model for the aircraft, initial conditions for the aircraft, and real time data of the aircraft.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods configured to deliver accurate fuel consumption information of an aircraft to ground-based systems during aircraft operation without depending on continuous, real-time connections to the aircraft. In at least one example, per-tail aircraft performance models are generated, and calibrated using historic Quick Access Record (QAR) or continuous parameter logging (CPL) data to derive real-time fuel consumption information along a current and projected track of an aircraft. In order to increase accuracy, a parallel version of the model can be run on the flight deck, and results validates with actual flight data. Fuel consumption updates can be sent to a ground-based model when significant differences are detected.

Figure 1:
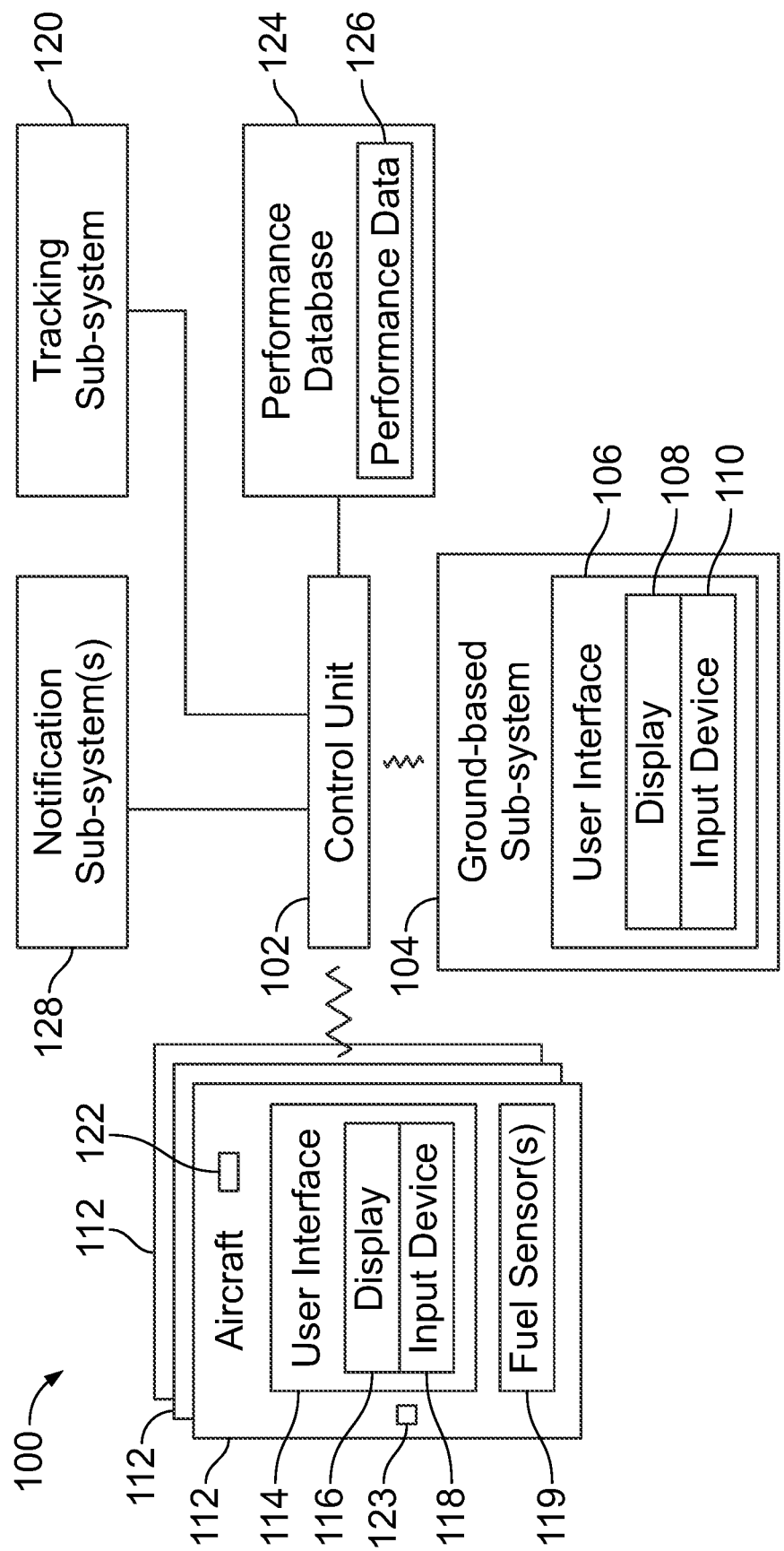
FIG. 1 illustrates a schematic block diagram of a system, according to an example of the present disclosure.

FIG. 1 illustrates a schematic block diagram of a system 100. The system 100 includes one or more control units, which include a control unit 102 in communication with a ground-based sub-system 104, such as through one or more wired or wireless connections. Examples of the ground-based sub-system 104 include a flight dispatcher, air traffic control, flight monitoring entities, airline operations centers, and/or the like. The ground-based sub-system 104 includes a user interface 106, which includes a display 108 and an input device 110. For example, the display 108 is an electronic monitor, television, and/or the like, and the input device 110 includes one or more of a keyboard, a mouse, a stylus, and/or the like. In at least one example, the display 108 and the input device 110 are integrated as a touchscreen interface. In at least one example, the user interface 106 is a computer workstation. As another example, the user interface 106 is a handheld device, such as a smartphone, smart tablet, or the like. In at least one example, the control unit 102 and the ground-based sub-system 104 are at a common location, such as at a central monitoring location. As another example, the control unit 102 and the ground-based sub-system 104 are remote from one another.

The control unit 102 is also in communication with one or more aircraft 112. For example, the control unit 102 is in communication with the aircraft 112 through one or more antennas, transceivers, radios, communication networks (such as private or public internet communications), and/or the like. In at least one example, the control unit 102 is remotely located from the aircraft 112. As another example, the aircraft 112 can include the control unit 102. In such an example, the control unit 102 can communicate with a user interface 114 of the aircraft, such as through one or more wired or wireless connections.

The user interface 114 of the aircraft 112 can be disposed within a flight deck or cockpit. For example, the user interface 114 can be part of a flight computer within the flight deck or cockpit. The user interface 114 includes a display 116 and an input device 118. For example, the display 116 is an electronic monitor, television, and/or the like, and the input device 118 includes one or more of a keyboard, a mouse, a stylus, and/or the like. In at least one example, the display 116 and the input device 118 are integrated as a touchscreen interface. In at least one example, the user interface 114 is a computer workstation. As another example, the user interface 114 is a handheld device, such as a smartphone, smart tablet, or the like.

The aircraft 112 also includes one or more fuel sensors 119. The fuel sensors 119 detect a current fuel level for the aircraft 112.

The aircraft 112 also includes controls 123 for controlling operating of the aircraft 112. Examples of the controls 123 include a steering console, a yoke, a joystick, one or more brakes, buttons, dials, one or more keys, accelerators, buttons or pedals, and/or the like.

The control unit 102 is also in communication with a tracking sub-system 120, such as through one or more wired or wireless connections. The tracking sub-system 120 can be remotely located from the control unit 102. The tracking sub-system 120 is configured to track real time data of the aircraft 112, such as positions of the aircraft 112 within an airspace. For example, the aircraft 112 include one or more position sensors 122 that are detected and tracked by the tracking sub-system 120. The tracking sub-system 120 can be a radar sub-system. As another example, the tracking sub-system 120 can be an automatic dependent surveillance-broadcast (ADS-B) sub-system.

In at least one example, the position sensor 122 can be an ADS-B transmitter configured to output an ADS-B OUT signal. The ADS-B OUT signal provides information regarding the aircraft 112 within an airspace. For example, the ADS-B OUT signal provides position, heading, speed, altitude, and the like for the aircraft 112. The tracking sub-system 120 is configured to receive the ADS-B OUT signals from the aircraft 112. For example, the tracking sub-system 120 includes an ADS-B receiver that is configured to receive the ADS-B OUT signals from the aircraft 112. In this example, the tracking sub-system 120 is an ADS-B tracking sub-system that determines a current position of an aircraft 112 via satellite navigation through a positional signal (that is, the ADS-B OUT signal) of the aircraft 112 output by the ADS-B transmitter. As another example, the tracking sub-system 120 can be a global positioning system.

The control unit 102 is also in communication with a performance database 124 that stores performance data 126 for the aircraft 112. In at least one example, the performance database 124 can be onboard the aircraft 112, such as within a flight computer. As another example, the performance database 124 is remote from the aircraft 112. In at least one example, the performance database 124 is co-located with the control unit 102. As another example, the performance database 124 is remote from the control unit 102.

The performance data 126 includes information regarding operational capabilities of the aircraft 112. For example, the performance data 126 includes information regarding how much fuel the aircraft 112 having a particular weight will burn at a particular airspeed, at a particular altitude, for a particular period of time, etc. In at least one example, the performance data 126 includes one or more performance models for the aircraft 112. The performance models for the aircraft 112 can be predetermined and stored in a memory. The performance models can include generic performance models for a type, class, or family of aircraft. As an example, a generic performance model for a particular type of aircraft, such as a Boeing 737, can be determined upon the aircraft 112 being manufactured. As described herein, in at least one example, the control unit 102 generates a derived performance model for a specific aircraft 112 based on the generic performance model and historical data for the specific aircraft.

In at least one example, the control unit 102 is also in communication with one or more notification sub-systems 128, such as through one or more wired or wireless connections. The control unit 102 can be remotely located from the notification sub-systems 128, and in communication with the notification sub-systems 128 through one or more antennas, transceivers, radios, communication networks (such as private or public internet communications), and/or the like.

In at least one example, the notification sub-system(s) 128 provide quick access recorder (QAR) data to the control unit 102. As another example, the notification sub-system(s) 128 provide continuous parameter logging (CPL) data to the control unit 102. At least one of the notification sub-system(s) 128 can be onboard the aircraft 112.

In at least one example, the notification sub-system(s) 128 include Notice to Air Missions (NOTAMs) communication service. A NOTAM is a notice containing information provided to flight personnel. A NOTAM indicates a real-time and abnormal status of a national airspace system.

In at least one example, the notification sub-system(s) 128 include a Meteorological Aerodrome Reports (METAR) communication service. A METAR provides an observation of current surface weather at an airport.

In at least one example, the notification sub-system(s) 128 include a Terminal Aerodrome Forecast (TAF) communication service. A TAF provides a forecast of future weather at an airport.

In operation, the control unit 102 provides accurate real-time fuel consumption information to the ground-based sub-system 104 and the aircraft 112. In particular, the control unit 102 receives a performance model, which can be stored in the performance data 126, from the performance database 124 for the aircraft 112. In at least one example, the performance model is specific to a particular aircraft 112. That is, the performance model can be tail-specific to a particular aircraft 112. In at least one example, the performance model is determined based on historical performance data received from the aircraft 112. The historical performance data is determined from past flights, such as fuel consumption for the aircraft from past flights. The historical performance data can be updated after each flight of the aircraft 112. In at least one example, the performance model for the aircraft 112 is determined from fuel consumption data per flight phase.

After receiving the performance model from the performance database 124, the control unit 102 calibrates the performance model with tail specific data for the aircraft 112. In at least one example, the tail specific data includes either QAR data or CPL data. The control unit 102 can compare the data-driven performance model (such as calibrated by the QAR and/or CPL data) with one or more dynamic factors.

In at least one example, the control unit 102 receives one or more initial flight conditions for the aircraft 112. The control unit 102 can receive the initial flight conditions from one or more of the notification sub-systems 128, for example. The initial flight conditions can include various types of information for the aircraft 112 before a scheduled flight. For example, the initial flight conditions include payload of the aircraft 112, total fuel onboard the aircraft 112, a center of gravity of the aircraft 112, and expected weather conditions for the flight of the aircraft 112 between a departure airport and an arrival airport. During flight, the control unit receives trajectory data for the aircraft, such as from the tracking sub-system 120. The trajectory data can be ADS-B data.

In at least one example, the control unit 102 derives fuel consumption data from the performance model of the aircraft 112. That is, instead of receiving continual updates from the fuel sensors 119 of the aircraft 112 (which would otherwise be costly in terms of communication), the control unit 102 determines the fuel consumption for the aircraft for a flight based on the performance data 126 of the aircraft 112. The control unit 102 outputs the fuel consumption data based on the performance model to the ground-based sub-system 104 and the aircraft 112. The fuel consumption data can be shown on the displays 108 and 116.

In at least one example, the control unit 102 validates fuel consumption data (derived from the performance model of the aircraft 112) in relation to actual fuel consumption of the aircraft 112 by running a parallel model onboard the aircraft 112. That is, the control unit 102 determines a fuel consumption model for the aircraft 112 based on the performance model of the aircraft 112. The fuel consumption model is output to the ground-based sub-system 104 (and can be shown on the display 108), as well as the aircraft 112 (and can be shown on the display 116). The fuel consumption model onboard the aircraft 112 is compared against actual fuel consumption, as determined by the fuel sensor(s) 119 of the aircraft. For example, the fuel consumption model can be automatically compared to the actual fuel consumption, such as by one the control unit 102, another control unit onboard the aircraft 112 and/or the like. Optionally, a pilot can view the fuel consumption model on the display 116, and compare it to the actual fuel consumption, which can be shown on the display 116, and/or a separate fuel gauge. If the fuel consumption model and the actual fuel consumption conform to one another (such as within a tolerance of +/−1% or less), the control unit 102 determines that the fuel consumption model at the ground-based sub-system 104 is accurate. If, however, the fuel consumption model and the actual fuel consumption do not conform to one another (for example, are outside of the tolerance), the aircraft 112 outputs the actual fuel consumption to the control unit 102, which then sends an update signal to the ground-based sub-system 104 that updates the fuel consumption model to conform to the actual fuel consumption. In at least one example, the control unit 102 updates the fuel consumption model (such as by sending updates to the ground-based sub-system 104) when significant discrepancies (such as outside of predetermined tolerances) are detected, such as via a comparison of actual fuel consumption (as determined by the fuel sensor(s) 119), and the fuel consumption model. In this case, the control unit 102 provides the updates to the ground-based sub-system 104, which are then used to reset or refine the on-ground calculation process to provide an accurate situational picture of fuel consumption.

In at least one example, the systems and methods described herein employ a flight-deck-based model to check for any divergence between the on-board model and the flight actuals, only updating the ground-based model on an as-needed basis, thereby ensuring accuracy while limiting the bandwidth (cost). Further, the tracking sub-system 120 provides data regarding a projected flight path for the aircraft 112. Based on the projected flight path, the control unit 102 can automatically output fuel alerts, and estimated fuel levels for one or more alternate flight paths.

Communications between the aircraft 112, the control unit 102, and the ground-based sub-system 104 can be limited to times when there is a significant discrepancy (such as outside of a predetermined tolerance) between the fuel consumption model and the actual fuel consumption. As such, communications cost are significantly reduced as compared to a continuous communication between the aircraft 112, the control unit 102, and the ground-based sub-system 104.

In at least one example, the control unit 102 can automatically operate one or more controls of the aircraft 112 in response to the actual fuel consumption differing from the fuel consumption model. For example, the control unit 102 can send control signal to the aircraft 112 to one or more of reduce/increase airspeed, increase/reduce altitude, and/or the like to ensure that the actual fuel consumption aligns with the fuel consumption model. Optionally, the control unit 102 may not automatically operate the aircraft 112.

The systems and methods described herein increase operational efficiency, and significantly reduce communications costs. As for the operational benefits, disseminating consistent and accurate information about an aircraft 112 throughout operation reduces churn in a decision-making process and ultimately supports better outcomes. With respect to cost savings, the systems and methods described herein provide highly accurate fuel information to the ground-based sub-system 104 at a much lower cost than dedicated, continuous communications connections to the aircraft 112.

Figure 2:
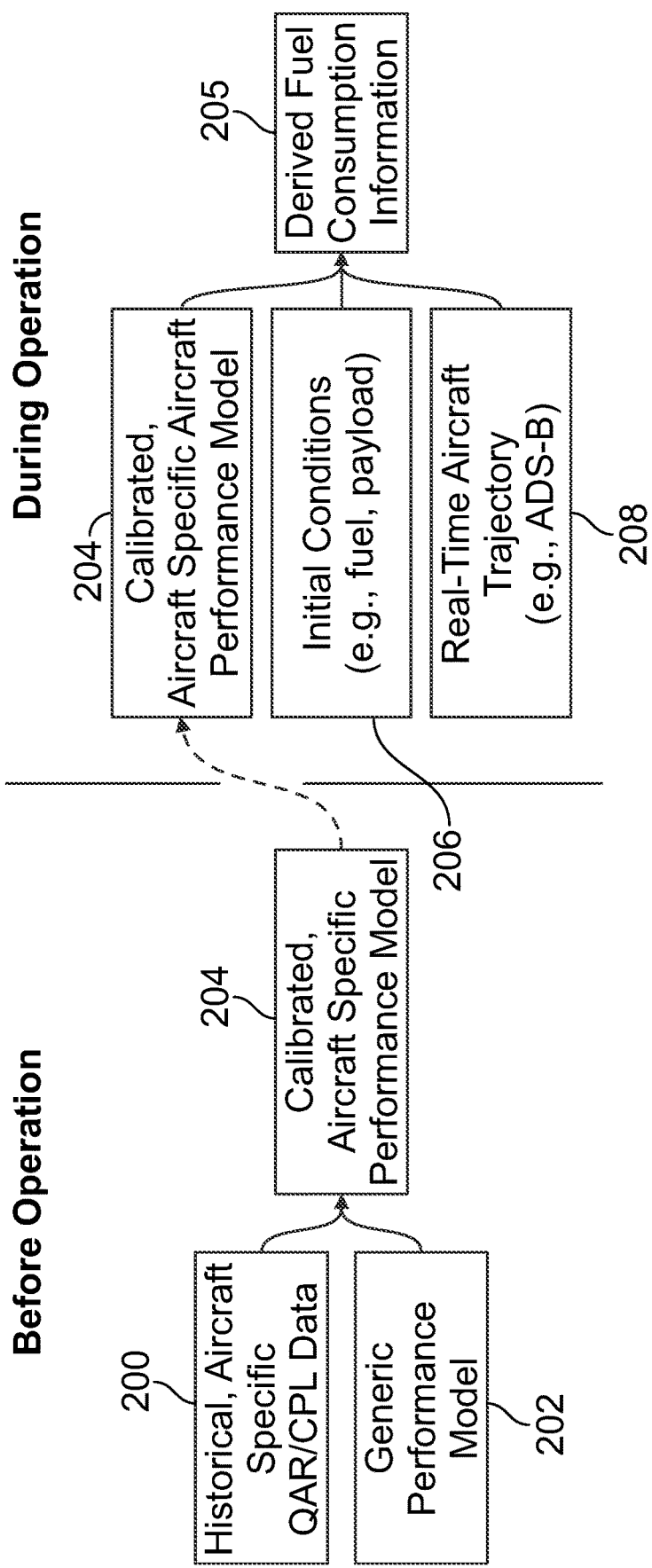
FIG. 2 illustrates a block diagram of data used to determine a fuel consumption model for an aircraft, according to an example of the present disclosure.

FIG. 2 illustrates a block diagram of data used to determine a fuel consumption model for an aircraft, according to an example of the present disclosure. Referring to FIGS. 1 and 2, before operation (that is, before a scheduled flight of the aircraft 112), the control unit 102 receives historical, aircraft specific QAR and/or CPL data 200, such as from the notification sub-system 128 and/or a flight database of past flights. Further, the control unit 102 receives a generic performance model 202 for the aircraft 112, such as from the performance database 124. The control unit 102 then combines the data 200 and the generic performance model 202 to generate a calibrated aircraft specific performance model 204.

During operation (that is, during the flight of the aircraft 112), the control unit 102 determines a derived fuel consumption model 205 (or information) based on the calibrated aircraft specific performance model 204, initial conditions 206 of the aircraft 112 (for example, fuel, payload, weight, and/or the like), which can be received from a flight computer of the aircraft 112 and/or a notification sub-system 128, and real-time aircraft data 208, such as received from the tracking sub-system 120.

Figure 3:
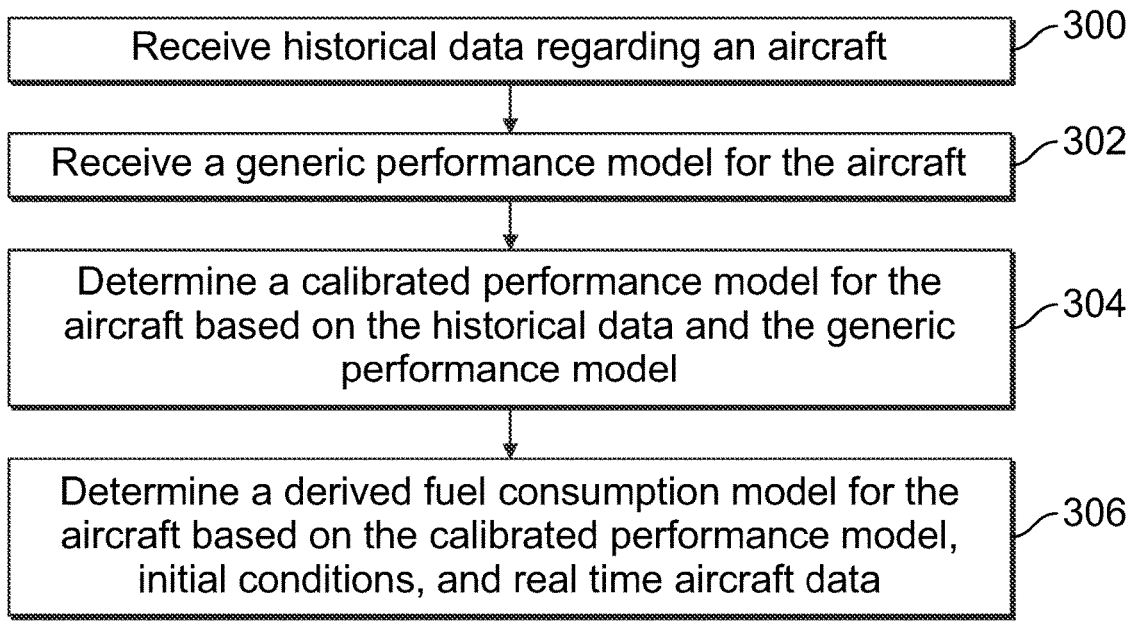
FIG. 3 illustrates a flow chart of a method of determined a derived fuel consumption model, according to an example of the present disclosure.

FIG. 3 illustrates a flow chart of a method of determined a derived fuel consumption model, according to an example of the present disclosure. Referring to FIGS. 1 and 3, at 300, the control unit 102 receives historical data regarding an aircraft 112. The historical data includes fuel consumption information from past flights of the aircraft 112. At 302, the control unit 102 receives a generic performance model for the aircraft 112, such as from the performance database 124. The generic performance model can be a performance model for a particular type, class, family, and/or the like of the aircraft 112, such as determined by a manufacturer. At 304, the control unit 102 determines a calibrated performance model for the aircraft 112 based on the historical data (that is, actual data from prior flights of the specific aircraft 112), and the generic performance model. As an example, the control unit 102 compares the generic performance model with the historical data, and revises the generic performance model according to the historical data. At 306, the control unit 102 determines a derived fuel consumption model for the aircraft 112 based on the calibrated performance model, initial conditions, and real time aircraft data. For example, the control unit 102 revises the derived fuel consumption model in view of the initial conditions of the aircraft 112, and real time aircraft data, as received from the tracking sub-system 120, a weather monitoring service, and/or the like.

Figure 4:
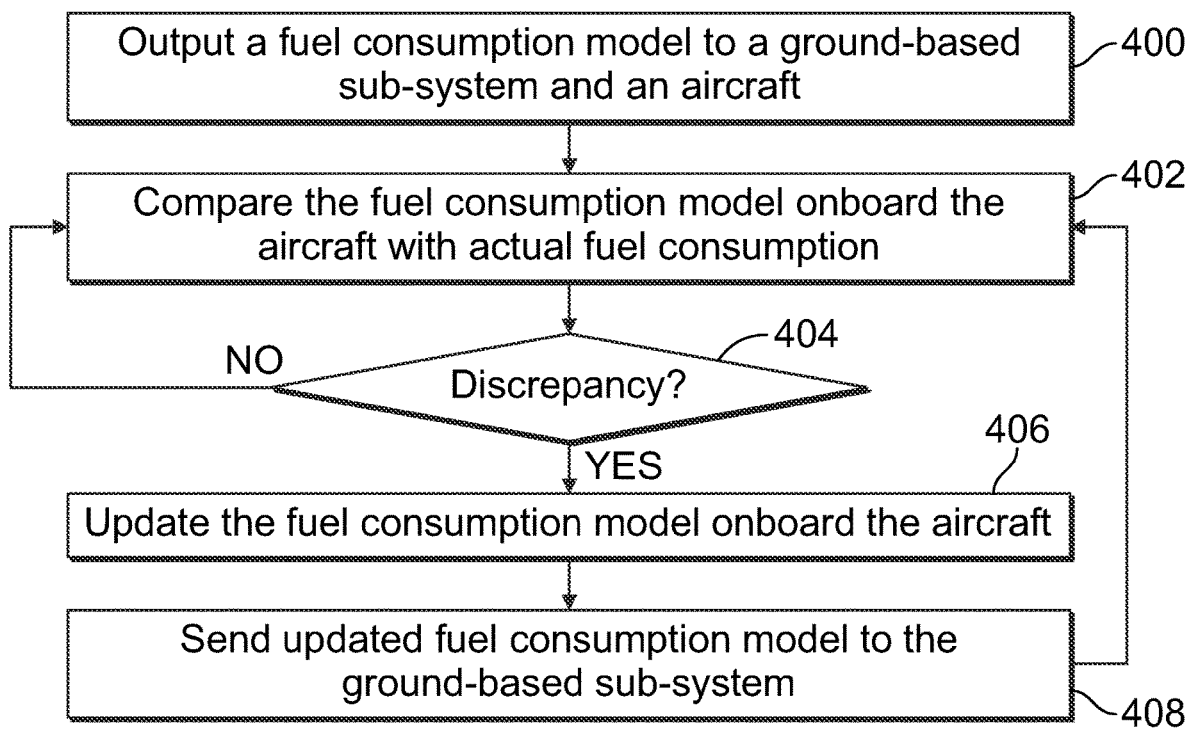
FIG. 4 illustrates a flow chart of a method, according to an example of the present disclosure.

FIG. 4 illustrates a flow chart of a method, according to an example of the present disclosure. Referring to FIGS. 1 and 4, at 400, the control unit 102 outputs a fuel consumption model to the ground-based sub-system 104 and the aircraft 112. The fuel consumption model can be the derived fuel consumption model shown and described in FIG. 3. As such, the ground-based sub-system 104 has a first fuel consumption model for the aircraft 112, and the aircraft 112 has a second fuel consumption model. Upon receipt, the first fuel consumption model is the same as the second fuel consumption model.

At 402, during a flight of the aircraft 112, the fuel consumption model onboard the aircraft 112 (that is, the second fuel consumption model) is compared with the actual fuel consumption, as determined by the one or more fuel sensor(s) 119. One or more control units, such as the control unit 102 and/or a control unit of a flight computer of the aircraft 112 performs the comparison.

At 404, the control unit(s) determine if there is a discrepancy between the fuel consumption model onboard the aircraft 112 and the actual fuel consumption, such as with respect to a predetermined tolerance. The predetermined tolerance can be a difference of 1%. Optionally, the predetermined tolerance can be less than 1%, such as 0.2%, 0.5%, etc. Optionally, the predetermined tolerance can be greater than 1%, such as 1.5%, 2%, etc.

If the fuel consumption model onboard the aircraft 112 does not differ from the actual fuel consumption, the method returns to 402. If, however, the fuel consumption model onboard the aircraft 112 differs from the actual fuel consumption, the method proceeds to 406, at which the aircraft 112 outputs a signal including data regarding the actual fuel consumption difference, and the control unit 102 then, in turn, outputs an update signal to the aircraft 112, which updates the fuel consumption model onboard the aircraft 112 to conform to the actual fuel consumption. At 408, the control unit 102 also outputs an update signal to the ground-based sub-system 104, which updates the fuel consumption model (for example, the first fuel consumption model) at the ground-based sub-system 104. The method then returns to 402.

Referring to FIGS. 1-4, the systems and methods described herein include one or more control units (such as the control unit 102) configured to determine one or more fuel consumption models for an aircraft 112. In at least one example, the one or more control units are configured to determine the one or more fuel consumption models for the aircraft 112 based on a calibrated performance model for the aircraft, initial conditions for the aircraft, and real time aircraft data. In at least one example, the one or more control units are configured to determine the calibrated performance model based on historical data of the aircraft 112, and a generic performance model.

In at least one example, the one or more fuel consumption models include a first fuel consumption model and a second fuel consumption model. The one or more control units are configured to output the first fuel consumption model to the ground-based sub-system 104, and the one or more control units are configured to output the second fuel consumption model to the aircraft 112. As a further example, the one or more control units are configured to compare the second fuel consumption model with actual fuel consumption determined by one or more fuel sensors 119 of the aircraft 112. In at least one further example, the one or more control units are configured to update both of the first fuel consumption model and the second fuel consumption model in response to the second fuel consumption model differing from the actual fuel consumption.

Figure 5:
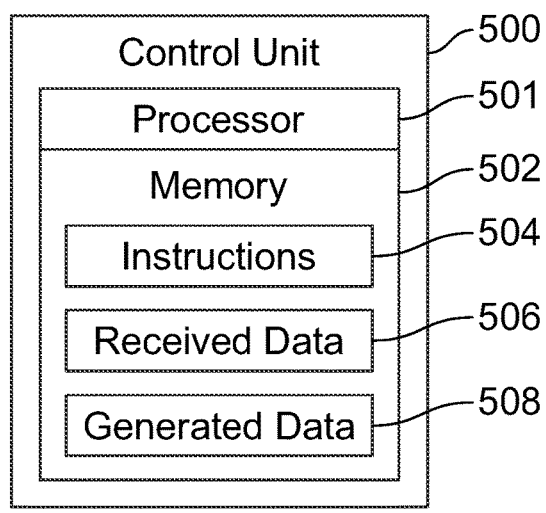
FIG. 5 illustrates a schematic block diagram of a control unit, according to an example of the present disclosure.

FIG. 5 illustrates a schematic block diagram of a control unit 500, according to an example of the present disclosure. The control unit 102 shown in FIG. 1 can be configured as the control unit 500. In at least one example, the control unit 500 includes at least one processor 501 in communication with a memory 502. The memory 502 stores instructions 504, received data 506, and generated data 508. The control unit 500 shown in FIG. 5 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-5, examples of the subject disclosure provide systems and methods that allow large amounts of data to be quickly and efficiently analyzed by a computing device. For example, the control unit 102 can analyze various aspects of aircraft 112, air traffic, notifications, performance models, and the like. As such, large amounts of data, which may not be discernable by human beings, are being tracked and analyzed. The vast amounts of data are efficiently organized and/or analyzed by the control unit 102, as described herein. The control unit 102 analyzes the data in a relatively short time in order to quickly and efficiently determine fuel consumption models. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the control unit 102, provide and/or enable a computer system to operate as a special computer system for automatically determining fuel consumption models. The control unit 102 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the control unit 102 can be an artificial intelligence or machine learning system. These types of systems may be trained from outside information and/or self-trained to repeatedly improve the accuracy with how data is analyzed to automatically determine fuel consumption models. Over time, these systems can improve by determining such information with increasing accuracy and speed, thereby significantly reducing the likelihood of any potential errors. For example, the AI or machine-learning systems can learn and determine the performance capabilities of aircraft, traffic at airports, and the like, and automatically determine the fuel consumption models. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of fuel levels. The training minimizes conflicts and interference by performing an iterative training algorithm, in which the systems are retrained with an updated set of data (for example, data received before, during, and/or after each flight of the aircraft 112) and based on the feedback examined prior to the most recent training of the systems. This provides a robust analysis model that can better determine situational information in a cost effective and efficient manner.

Figure 6:
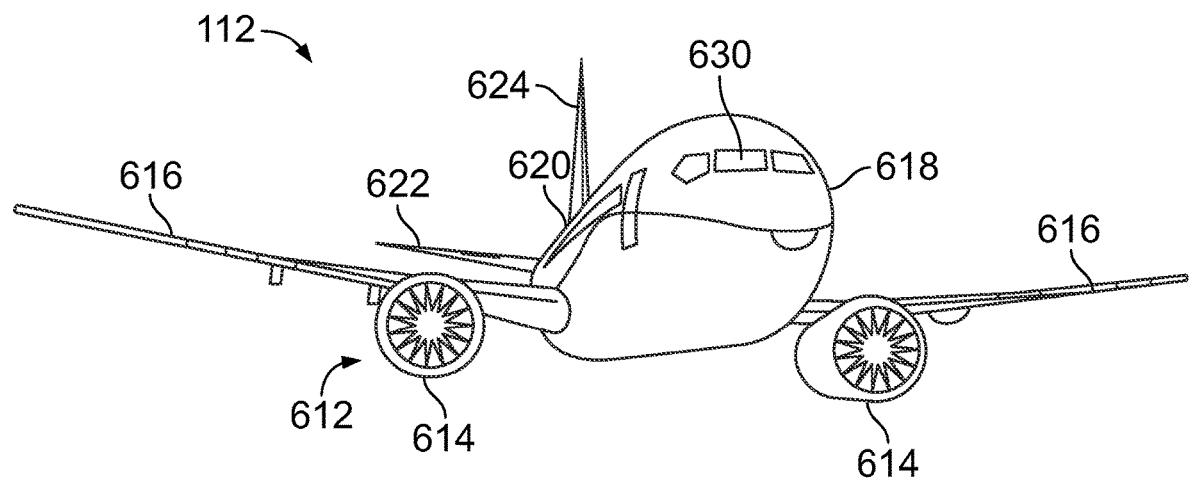
FIG. 6 illustrates a perspective front view of an aircraft, according to an example of the present disclosure.

FIG. 6 illustrates a perspective front view of an aircraft 112, according to an example of the present disclosure. The aircraft 112 includes a propulsion system 612 that includes engines 614, for example. Optionally, the propulsion system 612 may include more engines 614 than shown. The engines 614 are carried by wings 616 of the aircraft 112. In other examples, the engines 614 may be carried by a fuselage 618 and/or an empennage 620. The empennage 620 may also support horizontal stabilizers 622 and a vertical stabilizer 624. The fuselage 618 of the aircraft 112 defines an internal cabin 630, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 112. It is to be understood that the aircraft 112 can be sized, shaped, and configured differently than shown in FIG. 6. In at least one example, the systems and methods described herein can be used to derive energy consumption information for various other types of power sources, such as batteries, hydrogen cells, or the like.

Further, the disclosure comprises examples according to the following clauses:

Clause 1. A system comprising:
one or more control units configured to determine one or more fuel consumption models for an aircraft.

Clause 2. The system of Clause 1, wherein the one or more control units are configured to determine the one or more fuel consumption models for the aircraft based on a calibrated performance model for the aircraft, initial conditions for the aircraft, and real time data of the aircraft.

Clause 3. The system of Clause 2, further comprising a tracking sub-system that determines the real time data of the aircraft.

Clause 4. The system of Clauses 2 or 3, wherein the calibrated performance model is based on Quick Access Record (QAR) data or continuous parameter logging (CPL) data.

Clause 5. The system of any of Clauses 2-4, wherein the one or more control units are configured to determine the calibrated performance model based on historical data of the aircraft, and a generic performance model.

Clause 6. The system of any of Clauses 2-5, wherein the initial conditions comprise payload of the aircraft, total fuel onboard the aircraft, a center of gravity of the aircraft, and weather conditions for a flight of the aircraft.

Clause 7. The system of any of Clauses 1-6, wherein the one or more fuel consumption models comprise a first fuel consumption model and a second fuel consumption model, wherein the one or more control units are configured to output the first fuel consumption model to a ground-based sub-system, and wherein the one or more control units are configured to output the second fuel consumption model to the aircraft.

Clause 8. The system of Clause 7, wherein the one or more control units are configured to compare the second fuel consumption model with actual fuel consumption determined by one or more fuel sensors of the aircraft.

Clause 9. The system of Clause 8, wherein the one or more control units are configured to update both of the first fuel consumption model and the second fuel consumption model in response to the second fuel consumption model differing from the actual fuel consumption.

Clause 10. The system of any of Clauses 1-9, further comprising one or more user interfaces including a display and an input device, wherein the control unit is configured to show the one or more fuel consumption models on the display.

Clause 11. The system of any of Clauses 1-10, wherein the one or more control units are further configured to automatically operate one or more controls of the aircraft based on the one or more fuel consumption models.

Clause 12. The system of any of Clauses 1-11, wherein the one or more control units comprise an artificial intelligence or machine learning system.

Clause 13. A method comprising:
determining, by one or more control units, one or more fuel consumption models for an aircraft, wherein said determining is based on a calibrated performance model for the aircraft, initial conditions for the aircraft, and real time data of the aircraft.

Clause 14. The method of Clause 13, further comprising determining, by a tracking sub-system, the real time data of the aircraft.

Clause 15. The method of Clauses 13 or 14, wherein the calibrated performance model is based on Quick Access Record (QAR) data or continuous parameter logging (CPL) data.

Clause 16. The method of any of Clauses 13-15, wherein said determining further comprises determining the calibrated performance model based on historical data of the aircraft, and a generic performance model.

Clause 17. The method of any of Clauses 13-16, wherein the initial conditions comprise payload of the aircraft, total fuel onboard the aircraft, a center of gravity of the aircraft, and weather conditions for a flight of the aircraft.

Clause 18. The method of any of Clauses 13-17, wherein the one or more fuel consumption models comprise a first fuel consumption model and a second fuel consumption model, wherein the method further comprises:
outputting, by the one or more control units, the first fuel consumption model to a ground-based sub-system;
outputting, by the one or more control units, the second fuel consumption model to the aircraft;
comparing, by the one or more control units. the second fuel consumption model with actual fuel consumption determined by one or more fuel sensors of the aircraft; and
updating, by the one or more control units, both of the first fuel consumption model and the second fuel consumption model in response to the second fuel consumption model differing from the actual fuel consumption.

Clause 19. The method of any of Clauses 13-18, further comprising automatically operating, by the one or more control units, one or more controls of the aircraft based on the one or more fuel consumption models.

Clause 20. A non-transitory computer-readable storage medium comprising executable instructions that, in response to execution, cause one or more control units comprising a processor, to perform operations comprising:
determining one or more fuel consumption models for an aircraft, wherein said determining is based on a calibrated performance model for the aircraft, initial conditions for the aircraft, and real time data of the aircraft.

As described herein, examples of the present disclosure provide systems and methods for efficiently and effectively deriving, providing, and updating fuel consumption information for aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
    one or more control units disposed onboard an aircraft and configured to obtain predicted fuel consumption data for a flight of the aircraft, wherein the predicted fuel consumption data predicts consumption of fuel by the aircraft over time during the flight prior to the aircraft consuming the fuel, the one or more control units configured to communicate the predicted fuel consumption data to a ground-based sub-system,
    wherein, during the flight, the one or more control units are configured to determine actual fuel consumption data of the aircraft via one or more fuel sensors onboard the aircraft, and to compare the actual fuel consumption data to the predicted fuel consumption data,
    wherein, responsive to a difference between the actual fuel consumption data and the predicted fuel consumption data being greater than a predetermined tolerance, the one or more control units are configured to communicate an update signal from the aircraft to the ground-based sub-system, the update signal including a value of the actual fuel consumption data.

2. The system of claim 1, wherein the one or more control units are configured to obtain a performance model for the aircraft, the performance model configured to generate the predicted fuel consumption data for the flight of the aircraft.

3. The system of claim 2, wherein the one or more control units are configured to obtain the predicted fuel consumption data for the flight of the aircraft by inputting initial conditions for the aircraft before the flight and real time data of the aircraft during the flight into the performance model.

4. The system of claim 3, wherein the performance model is based on at least one of Quick Access Record (QAR) data or continuous parameter logging (CPL) data.

5. The system of claim 3, wherein the one or more control units are configured to generate the performance model to be specific to the aircraft using historical data of the aircraft.

6. The system of claim 3, wherein the initial conditions comprise payload of the aircraft, total fuel onboard the aircraft, a center of gravity of the aircraft, and weather conditions for the flight of the aircraft.

7. The system of claim 1, wherein the one or more control units are configured to update a fuel consumption model, that outputs the predicted fuel consumption data, based on the value of the actual fuel consumption data so that the predicted fuel consumption data output by the fuel consumption model conforms to the actual fuel consumption data.

8. The system of claim 1, further comprising one or more user interfaces including a display and an input device, wherein the one or more control units are configured to show the predicted fuel consumption data on the display.

9. The system of claim 1, wherein the one or more control units are further configured to automatically modify at least one of an airspeed or an altitude of the aircraft based on the difference between the actual fuel consumption data and the predicted fuel consumption data.

10. The system of claim 1, wherein the one or more control units comprise an artificial intelligence or machine learning system.

11. The system of claim 1, wherein, responsive to the difference between the actual fuel consumption data and the predicted fuel consumption data not being greater than the predetermined tolerance, the one or more control units are configured to determine that the predicted fuel consumption data is accurate and not communicate the update signal to the ground-based sub-system.

12. A method comprising:
    obtaining, by one or more control units disposed onboard an aircraft, predicted fuel consumption data for a flight of the aircraft, wherein the predicted fuel consumption data predicts consumption of fuel by the aircraft over time during the flight prior to the aircraft consuming the fuel;
    communicating the predicted fuel consumption data to a ground-based sub-system;
    determining actual fuel consumption data of the aircraft during the flight via one or more fuel sensors onboard the aircraft;

comparing, via the one or more control units, the actual fuel consumption data to the predicted fuel consumption data;

in response to a difference between the actual fuel consumption data and the predicted fuel consumption data being greater than a predetermined tolerance, communicating an update signal from the aircraft to the ground-based sub-system, the update signal including a value of the actual fuel consumption data; and in response to the difference between the actual fuel consumption data and the predicted fuel consumption data not being greater than the predetermined tolerance, determining that the predicted fuel consumption data is accurate and not communicating the update signal to the ground-based sub-system.

13. The method of claim 12, wherein the one or more control units are configured to obtain the predicted fuel consumption data by inputting initial conditions for the aircraft before the flight and real time data of the aircraft during the flight into a performance model that is specific to the aircraft.

14. The method of claim 13, further comprising generating the performance model, via the one or more control units, to be specific to the aircraft using historical data of the aircraft.

15. The method of claim 13, wherein the initial conditions comprise payload of the aircraft, total fuel onboard the aircraft, a center of gravity of the aircraft, and weather conditions for the flight of the aircraft.

16. The method of claim 12, further comprising automatically modifying, by the one or more control units, at least one of an airspeed or an altitude of the aircraft based on the difference between the actual fuel consumption data and the predicted fuel consumption data.

17. The method of claim 12, further comprising updating a fuel consumption model based on the value of the actual fuel consumption data, the fuel consumption model configured to output the predicted fuel consumption data, wherein the fuel consumption model is updated so that subsequent predicted fuel consumption data output by the fuel consumption model conforms to the actual fuel consumption data.

18. A non-transitory computer-readable storage medium comprising executable instructions that, in response to execution, cause one or more control units comprising a processor and disposed onboard an aircraft, to perform operations comprising:

determining predicted fuel consumption data for a flight of the aircraft, wherein said predicted fuel consumption data is determined by inputting initial conditions for the aircraft before the flight and real time data of the aircraft during the flight into a performance model that is specific to the aircraft, wherein the predicted fuel consumption data predicts consumption of fuel by the aircraft over time during the flight prior to the aircraft consuming the fuel;

communicating the predicted fuel consumption data to a ground-based sub-system;

determining actual fuel consumption data of the aircraft during the flight via one or more fuel sensors onboard the aircraft;

comparing the actual fuel consumption data to the predicted fuel consumption data;

in response to a difference between the actual fuel consumption data and the predicted fuel consumption data being greater than a predetermined tolerance, communicating an update signal from the aircraft to the ground-based sub-system, the update signal including a value of the actual fuel consumption data; and in response to the difference between the actual fuel consumption data and the predicted fuel consumption data not being greater than the predetermined tolerance, determining that the predicted fuel consumption data is accurate and not communicating the update signal to the ground-based sub-system.

19. The non-transitory computer-readable storage medium of claim 18, wherein the executable instructions, in response to execution, further cause the one or more control units to update a fuel consumption model based on the value of the actual fuel consumption data, the fuel consumption model configured to output the predicted fuel consumption data, wherein the fuel consumption model is updated so that subsequent predicted fuel consumption data output by the fuel consumption model conforms to the actual fuel consumption data.

20. The non-transitory computer-readable storage medium of claim 18, wherein the executable instructions, in response to execution, further cause the one or more control units to automatically modify at least one of an airspeed or an altitude of the aircraft based on the difference between the actual fuel consumption data and the predicted fuel consumption data.

* * * * *